United States Patent
Branson et al.

(10) Patent No.: US 9,405,553 B2
(45) Date of Patent: *Aug. 2, 2016

(54) PROCESSING ELEMENT MANAGEMENT IN A STREAMING DATA SYSTEM

(75) Inventors: Michael J. Branson, Rochester, MN (US); Ryan K. Cradick, Oronoco, MN (US); John M. Santosuosso, Rochester, MN (US); Brandon W. Schulz, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 438 days.

This patent is subject to a terminal disclaimer.

(21) Appl. No.: 13/361,287

(22) Filed: Jan. 30, 2012

(65) Prior Publication Data

US 2013/0198318 A1 Aug. 1, 2013

(51) Int. Cl.
  *G06F 15/16* (2006.01)
  *G06F 9/44* (2006.01)
  *G06F 9/50* (2006.01)

(52) U.S. Cl.
  CPC *G06F 9/44* (2013.01); *G06F 9/505* (2013.01); *G06F 2209/502* (2013.01)

(58) Field of Classification Search
  CPC .............. G06Q 10/10; G06F 17/30516; G06F 17/30575; G06F 17/30445; H04L 43/12
  USPC ......................................... 709/217, 231, 232
  See application file for complete search history.

(56) References Cited

U.S. PATENT DOCUMENTS

| 4,612,624 A | 9/1986 | Tsuji |
| 6,243,755 B1 | 6/2001 | Takagi et al. |
| 6,347,254 B1 | 2/2002 | Lu |

(Continued)

FOREIGN PATENT DOCUMENTS

| JP | 10097437 A | 4/1998 |
| JP | 2001325041 A | 11/2001 |
| WO | 2010020577 A1 | 2/2010 |

OTHER PUBLICATIONS

U.S. Appl. No. 13/682,008 entitled "Dynamic Reduction of Stream Backpressure", filed Nov. 20, 2012.

(Continued)

*Primary Examiner* — Philip Chea
*Assistant Examiner* — Mohammed Ahmed
(74) *Attorney, Agent, or Firm* — Patterson + Sheridan, LLP (57) ABSTRACT

Stream applications may inefficiently use the hardware resources that execute the processing elements of the data stream. For example, a compute node may host four processing elements and execute each using a CPU. However, other CPUs on the compute node may sit idle. To take advantage of these available hardware resources, a stream programmer may identify one or more processing elements that may be cloned. The cloned processing elements may be used to generate a different execution path that is parallel to the execution path that includes the original processing elements. Because the cloned processing elements contain the same operators as the original processing elements, the data stream that was previously flowing through only the original processing element may be split and sent through both the original and cloned processing elements. In this manner, the parallel execution path may use underutilized hardware resources to increase the throughput of the data stream.

13 Claims, 8 Drawing Sheets

(56) References Cited

U.S. PATENT DOCUMENTS

| | | | |
|---|---|---|---|
| 6,516,409 B1 | 2/2003 | Sato | |
| 7,206,861 B1 | 4/2007 | Callon | |
| 7,480,640 B1 | 1/2009 | Elad et al. | |
| 7,529,752 B2 | 5/2009 | Hinshaw et al. | |
| 7,577,667 B2 | 8/2009 | Hinshaw et al. | |
| 7,644,863 B2 | 1/2010 | Chen et al. | |
| 7,834,875 B2 | 11/2010 | Liu et al. | |
| 7,860,009 B2 | 12/2010 | Pike et al. | |
| 7,944,863 B2 | 5/2011 | Smith et al. | |
| 8,055,492 B2 | 11/2011 | Adir | |
| 8,090,974 B1 * | 1/2012 | Jain et al. | 714/3 |
| 2002/0083063 A1 | 6/2002 | Egolf | |
| 2003/0229817 A1 * | 12/2003 | Colasurdo et al. | 714/4 |
| 2004/0052212 A1 | 3/2004 | Baillargeon | |
| 2006/0004935 A1 | 1/2006 | Seto et al. | |
| 2006/0026269 A1 | 2/2006 | Sadovsky et al. | |
| 2006/0036619 A1 | 2/2006 | Fuerst et al. | |
| 2006/0064438 A1 | 3/2006 | Aggarwal | |
| 2006/0206706 A1 | 9/2006 | Dietz | |
| 2006/0218123 A1 | 9/2006 | Chowdhuri et al. | |
| 2006/0224763 A1 | 10/2006 | Altunbasak et al. | |
| 2006/0277230 A1 | 12/2006 | Nishizawa et al. | |
| 2007/0073685 A1 | 3/2007 | Thibodeau et al. | |
| 2007/0091089 A1 | 4/2007 | Jiao et al. | |
| 2007/0091827 A1 * | 4/2007 | Boers et al. | 370/255 |
| 2007/0129045 A1 | 6/2007 | Aerrabotu | |
| 2007/0147258 A1 * | 6/2007 | Mottishaw et al. | 370/241 |
| 2007/0240112 A1 * | 10/2007 | Haselden et al. | 717/121 |
| 2007/0288635 A1 * | 12/2007 | Gu et al. | 709/226 |
| 2007/0299980 A1 * | 12/2007 | Amini et al. | 709/231 |
| 2008/0000539 A1 | 1/2008 | Bivin | |
| 2008/0005392 A1 * | 1/2008 | Amini et al. | 710/29 |
| 2008/0028095 A1 * | 1/2008 | Lang et al. | 709/232 |
| 2008/0052041 A1 | 2/2008 | Misra et al. | |
| 2008/0071939 A1 | 3/2008 | Tanaka et al. | |
| 2008/0168179 A1 * | 7/2008 | Gu et al. | 709/231 |
| 2008/0219281 A1 | 9/2008 | Akin et al. | |
| 2008/0238923 A1 | 10/2008 | Liu et al. | |
| 2009/0003600 A1 | 1/2009 | Chen et al. | |
| 2009/0034498 A1 | 2/2009 | Banerjea et al. | |
| 2009/0037553 A1 * | 2/2009 | Yuan et al. | 709/209 |
| 2009/0178043 A1 | 7/2009 | Prasanna et al. | |
| 2009/0216624 A1 | 8/2009 | Kato | |
| 2009/0216694 A1 * | 8/2009 | Lang et al. | 706/12 |
| 2009/0254774 A1 | 10/2009 | Chamdani et al. | |
| 2009/0313400 A1 | 12/2009 | Amini et al. | |
| 2009/0313614 A1 * | 12/2009 | Andrade et al. | 717/151 |
| 2010/0030896 A1 | 2/2010 | Chandramouli et al. | |
| 2010/0106946 A1 * | 4/2010 | Imaki et al. | 712/220 |
| 2010/0199276 A1 | 8/2010 | Umbehocker | |
| 2010/0229178 A1 | 9/2010 | Ito | |
| 2010/0292980 A1 | 11/2010 | Andrade et al. | |
| 2010/0293532 A1 | 11/2010 | Andrade et al. | |
| 2011/0022812 A1 | 1/2011 | van der Linden et al. | |
| 2012/0123994 A1 | 5/2012 | Lowry et al. | |
| 2012/0166417 A1 | 6/2012 | Chandramouli et al. | |
| 2012/0179809 A1 * | 7/2012 | Barsness et al. | 709/224 |
| 2012/0324453 A1 | 12/2012 | Chandramouli et al. | |
| 2013/0080652 A1 | 3/2013 | Cradick et al. | |
| 2013/0080653 A1 | 3/2013 | Santosuosso et al. | |
| 2013/0081042 A1 | 3/2013 | Branson et al. | |
| 2013/0290969 A1 | 10/2013 | Branson et al. | |
| 2013/0346390 A1 | 12/2013 | Jerzak et al. | |

OTHER PUBLICATIONS

U.S. Appl. No. 13/681,919 entitled "Using Predictive Determinism Within a Streaming Environment", filed Nov. 20, 2012.

U.S. Appl. No. 13/681,820 entitled "Dynamic Runtime Choosing of Processing Communication Methods", filed Nov. 20, 2012.

U.S. Appl. No. 13/681,769 entitled "Management System for Processing Streaming Data", filed Nov. 20, 2012.

U.S. Appl. No. 13/190,810 entitled "Management System for Processing Streaming Data", filed Jul. 26, 2011.

U.S. Appl. No. 13/709,405 entitled "Processing Element Management in a Streaming Data System", filed Dec. 10, 2012.

U.S. Appl. No. 13/456,600 entitled "Operator Graph Changes in Response to Dynamic Connections in Stream Computing Applications", filed Apr. 26, 2012.

U.S. Appl. No. 13/675,872 entitled "Streams Optional Execution Paths Depending Upon Data Rates", filed Nov. 13, 2012.

U.S. Appl. No. 13/706,115 entitled "Streams Optional Execution Paths Depending Upon Data Rates", filed Dec. 5. 2012.

U.S. Appl. No. 13/190,694 entitled "Dynamic Reduction of Stream Backpressure", filed Jul. 26, 2011.

U.S. Appl. No. 13/190,717 entitled "Using Predictive Determinism Within a Streaming Environment", filed Jul. 26, 2011.

U.S. Appl. No. 13/190,757 entitled "Dynamic Runtime Choosing of Processing Communication Methods", filed Jul. 26, 2011.

International Search Report and Written Opinion of the ISA dated Dec. 20, 2012—International Application No. PCT/IB2012/053790.

International Search Report and Written Opinion of the ISA dated May 14, 2013—International Application No. PCT/IB2013/050228.

Da Costa et al., "The Dynamic Trace Memoization Reuse Technique", Parallel Architectures and Compilation Techniques, Oct. 2000, pp. 92-99, Philadelphia, USA.

U.S. Appl. No. 13/780,800 entitled, "Operator Graph Changes in Response to Dynamic Connections in Stream Computing Applications", filed Feb. 28, 2013.

Lipasti et al., "Exceeding the dataflow limit via value prediction.", In Proceedings of the 29th annual ACM/IEEE international symposium on Microarchitecture (MICRO 29), IEEE Computer Society, Washington, DC, USA, 226-237.

Gedik, Bugra et al., SPADE: The System S Declarative Stream Processing Engine, Proceedings of the 2008 ACM SIGMOD international conference on Management of data, Jun. 2008, pp. 1123-1134, ACM, New York, United States.

Ishii, Atsushi et al., Elastic Stream Computing with Clouds, 2011 IEEE 4th International Conference on Cloud Computing, pp. 195-202, IEEE, Washington, DC, United States.

* cited by examiner

PROCESSING ELEMENT MANAGEMENT IN A STREAMING DATA SYSTEM

BACKGROUND

1. Field of the Invention

Embodiments of the present invention generally relate to stream computing applications. Specifically, the disclosed embodiments disclose distributing processing elements or operators to take advantage of underutilized hardware resources in a stream computing environment.

2. Description of the Related Art

While computer databases have become extremely sophisticated, the computing demands placed on database systems have also increased at a rapid pace. Database systems are typically configured to separate the process of storing data from accessing, manipulating or using data stored in the database. More specifically, databases use a model where data is first stored, then indexed, and finally queried. However, this model cannot meet the performance requirements of some real-time applications. For example, the rate at which a database system can receive and store incoming data limits how much data can be processed or otherwise evaluated. This, in turn, can limit the ability of database applications to process large amounts of data in real-time.

SUMMARY

Embodiments of the invention provide a method, system and computer program product for processing data. The method, system, and computer program receive streaming data to be processed by a plurality of processing elements comprising of one or more operators. The operators process at least a portion of the received data by operation of one or more computer processors. The method, system, and computer program establish an operator graph of the plurality of operators. The operator graph defines at least one execution path in which a first operator of the plurality of operators is configured to receive data tuples from at least one upstream operator and transmit data tuples to at least one downstream operator. The method, system, and computer program identify, relative to predefined criteria, an underutilized hardware resource in a computing system that executes the operators. The method, system, and computer program clone a first processing element of the plurality of processing elements such that the cloned processing element comprises the same one or more operators as the first processing element. The method, system, and computer program process the received streaming data in a first execution path that includes the cloned processing element where the first execution path executes in parallel to a second execution path that includes the first processing element. Moreover, the cloned processing element processes the received streaming data using the underutilized hardware resource.

In another embodiment, a method that receives streaming data to be processed by a plurality of processing elements comprising of one or more operators. The operators process at least a portion of the received data by operation of one or more computer processors. The method establishes an operator graph of the plurality of operators. The operator graph defines at least one execution path in which a first operator of the plurality of operators is configured to receive data tuples from at least one upstream operator and transmit data tuples to at least one downstream operator. The method identifies, relative to predefined criteria, an underutilized hardware resource in a computing system that executes the operators. The method also un-fuses a first operator from a first processing element of the plurality of processing elements, the first processing element comprising of a plurality of operators. The method fuses the first operator into a second processing element of the plurality of processing elements. After fusing the first operator, the method processes at least a portion of the received streaming data using the first operator, wherein the first operator processes the portion of the received streaming data using the underutilized hardware resource.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in milliseconds. Constructing an application using this type of processing has opened up a new programming paradigm that will allow for a broad variety of innovative applications, systems and processes to be developed, as well as present new challenges for application programmers and database developers.

In a stream computing application, operators are connected to one another such that data flows from one operator to the next (e.g., over a TCP/IP socket). Scalability is reached by distributing an application across nodes by creating executables (i.e., processing elements), as well as replicating processing elements on multiple nodes and load balancing among them. Operators in a stream computing application can be fused together to form a processing element that is executable. Doing so allows processing elements to share a common process space, resulting in much faster communication between operators than is available using inter-process communication techniques (e.g., using a TCP/IP socket). Further, processing elements can be inserted or removed dynamically from an operator graph representing the flow of data through the stream computing application.

Moreover, stream applications may inefficiently use the hardware resources that execute the processing elements of the data stream. For example, a compute node may host four processing elements and execute each using a CPU. However, other CPUs on the compute node may sit idle. To take advantage of these available hardware resources, a stream programmer or developer may identify one or more processing elements that may be cloned. The cloned processing elements may be used to generate a different execution path that is parallel to the execution path that includes the original processing elements. Because the cloned processing elements contain the same operators as the original processing elements, the data stream that was previously flowing through only the original processing element may be split and sent through both the original and cloned processing elements. In this manner, the parallel execution path may use underutilized hardware resources to increase the throughput of the data stream.

In another embodiment, the operators of a processing element may be distributed to take advantage of available computer hardware. For example, after detecting an idle CPU, the streaming application may split up the operators in the processing element and place them in multiple processing elements where one or more of the processing elements is assigned to the idle CPU.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present invention, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Figure 1A:
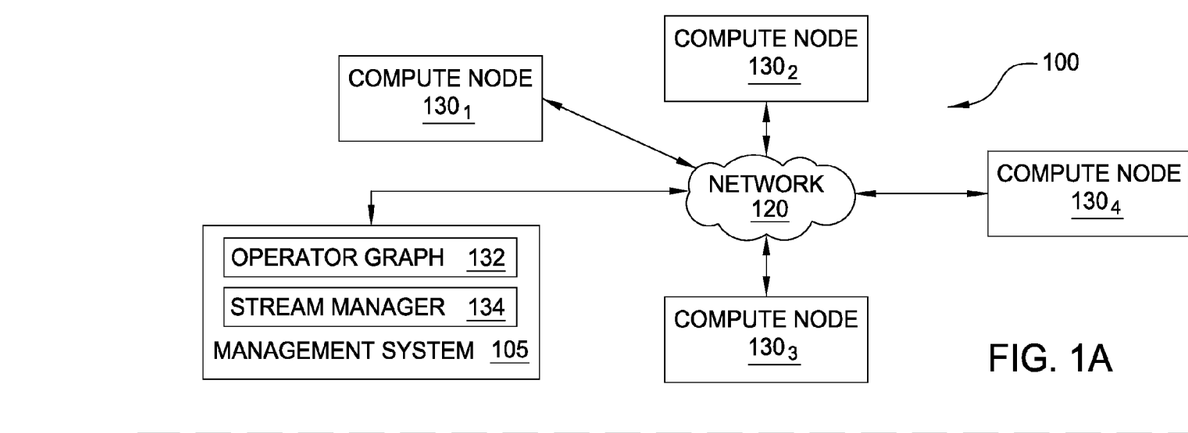
FIGS. 1A-1B illustrate a computing infrastructure configured to execute a stream computing application, according to embodiments of the invention.
Figure 1B:
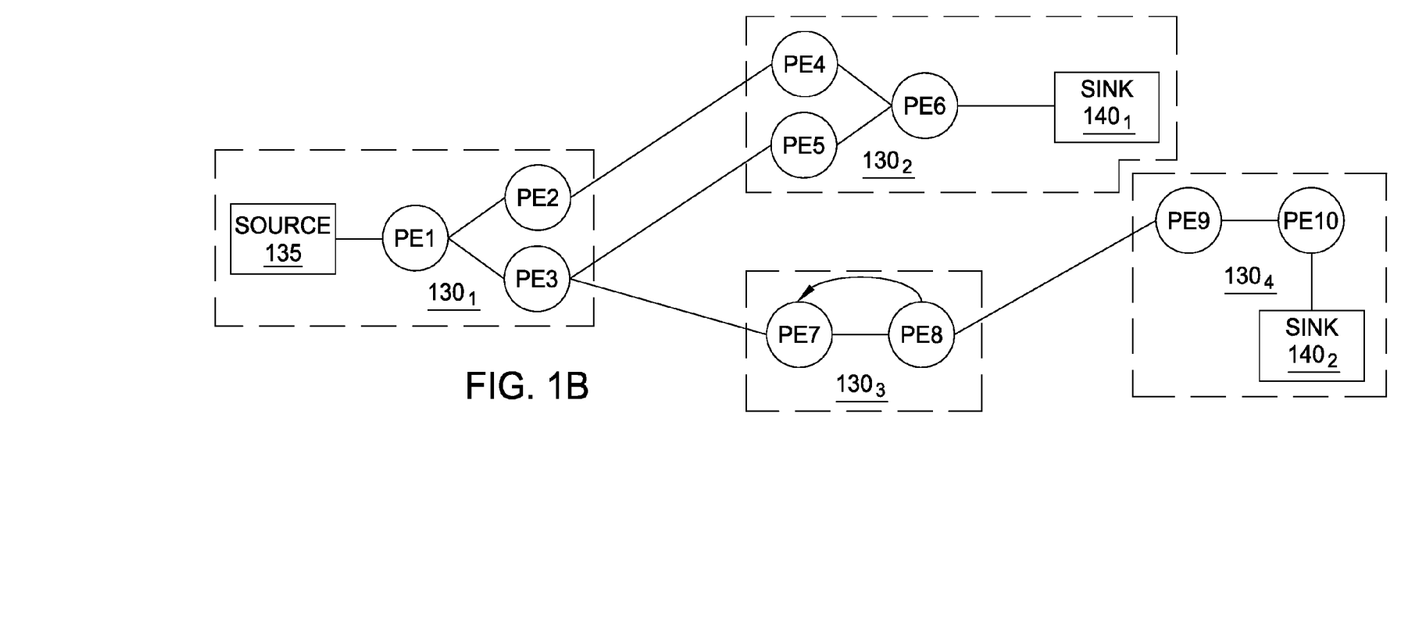

FIGS. 1A-1B illustrate a computing infrastructure configured to execute a stream computing application, according to one embodiment of the invention. As shown, the computing infrastructure 100 includes a management system 105 and a plurality of compute nodes $130_{1-4}$—i.e., hosts—which are communicatively coupled to each other using one or more communication devices 120. The communication devices 120 may be a server, network, or database and may use a particular communication protocol to transfer data between the compute nodes $130_{1-4}$. Although not shown, the compute nodes $130_{1-4}$ may have internal communication devices for transferring data between processing elements (PEs) located on the same compute node 130.

The management system 105 includes an operator graph 132 and a stream manager 134. As described in greater detail below, the operator graph 132 represents a stream application beginning from one or more source operators through to one or more sink operators. This flow from source to sink is also generally referred to herein as an execution path. Although FIG. 1B is abstracted to show connected PEs, the operator graph 132 may comprise of data flows between operators within the same PE or different PEs. Typically, processing elements receive an N-tuple of data attributes from the stream as well as emit an N-tuple of data attributes into the stream (except for a sink operator where the stream terminates or a source operator where the stream begins).

Of course, the N-tuple received by a processing element need not be the same N-tuple sent downstream. Additionally, PEs may be configured to receive or emit tuples in other formats (e.g., the PEs or operators could exchange data marked up as XML documents). Furthermore, each operator within a PE may be configured to carry out any form of data processing functions on the received tuple, including, for example, writing to database tables or performing other database operations such as data joins, splits, reads, etc., as well as performing other data analytic functions or operations.

The stream manager 134 may be configured to monitor a stream computing application running on the compute nodes $130_{1-4}$, as well as to change the deployment of the operator graph 132. The stream manager 134 may move PEs from one compute node 130 to another, for example, to manage the processing loads of the compute nodes 130 in the computing infrastructure 100. Further, stream manager 134 may control the stream computing application by inserting, removing, fusing, un-fusing, or otherwise modifying the processing elements and operators (or what data tuples flow to the processing elements) running on the compute nodes $130_{1-4}$. One example of a stream computing application is IBM®'s InfoSphere® Streams (note that InfoSphere® is a trademark of International Business Machines Corporation, registered in many jurisdictions worldwide).

FIG. 1B illustrates an example operator graph that includes ten processing elements (labeled as PE1-PE10) running on the compute nodes $130_{1-4}$. A processing element is composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

As shown, the operator graph begins at a source 135 (that flows into the processing element labeled PE1) and ends at sink $140_{1-2}$ (that flows from the processing elements labeled as PE6 and PE10). Compute node $130_1$ includes the processing elements PE1, PE2 and PE3. Source 135 flows into the processing element PE1, which in turn emits tuples that are received by PE2 and PE3. For example, PE1 may split data attributes received in a tuple and pass some data attributes to PE2, while passing other data attributes to PE3. Data that flows to PE2 is processed by the operators contained in PE2, and the resulting tuples are then emitted to PE4 on compute node $130_2$. Likewise, the data tuples emitted by PE4 flow to sink PE6 $140_1$. Similarly, data tuples flowing from PE3 to PE5 also reach sink PE6 $140_1$. Thus, in addition to being a sink for this example operator graph, PE6 could be configured to perform a join operation, combining tuples received from PE4 and PE5. This example operator graph also shows data tuples flowing from PE3 to PE7 on compute node $130_3$, which itself shows data tuples flowing to PE8 and looping back to PE7. Data tuples emitted from PE8 flow to PE9 on compute node $130_4$, which in turn emits tuples to be processed by sink PE10 $140_2$.

Because a processing element is a collection of fused operators, it is equally correct to describe the operator graph as execution paths between specific operators, which may include execution paths to different operators within the same processing element. FIG. 1B illustrates execution paths between processing elements for the sake of clarity.

Furthermore, although embodiments of the present invention are described within the context of a stream computing application, this is not the only context relevant to the present disclosure. Instead, such a description is without limitation and is for illustrative purposes only. Of course, one of ordinary skill in the art will recognize that embodiments of the present invention may be configured to operate with any computer system or application capable of performing the functions described herein. For example, embodiments of the invention may be configured to operate in a clustered environment with a standard database processing application.

Figure 2:
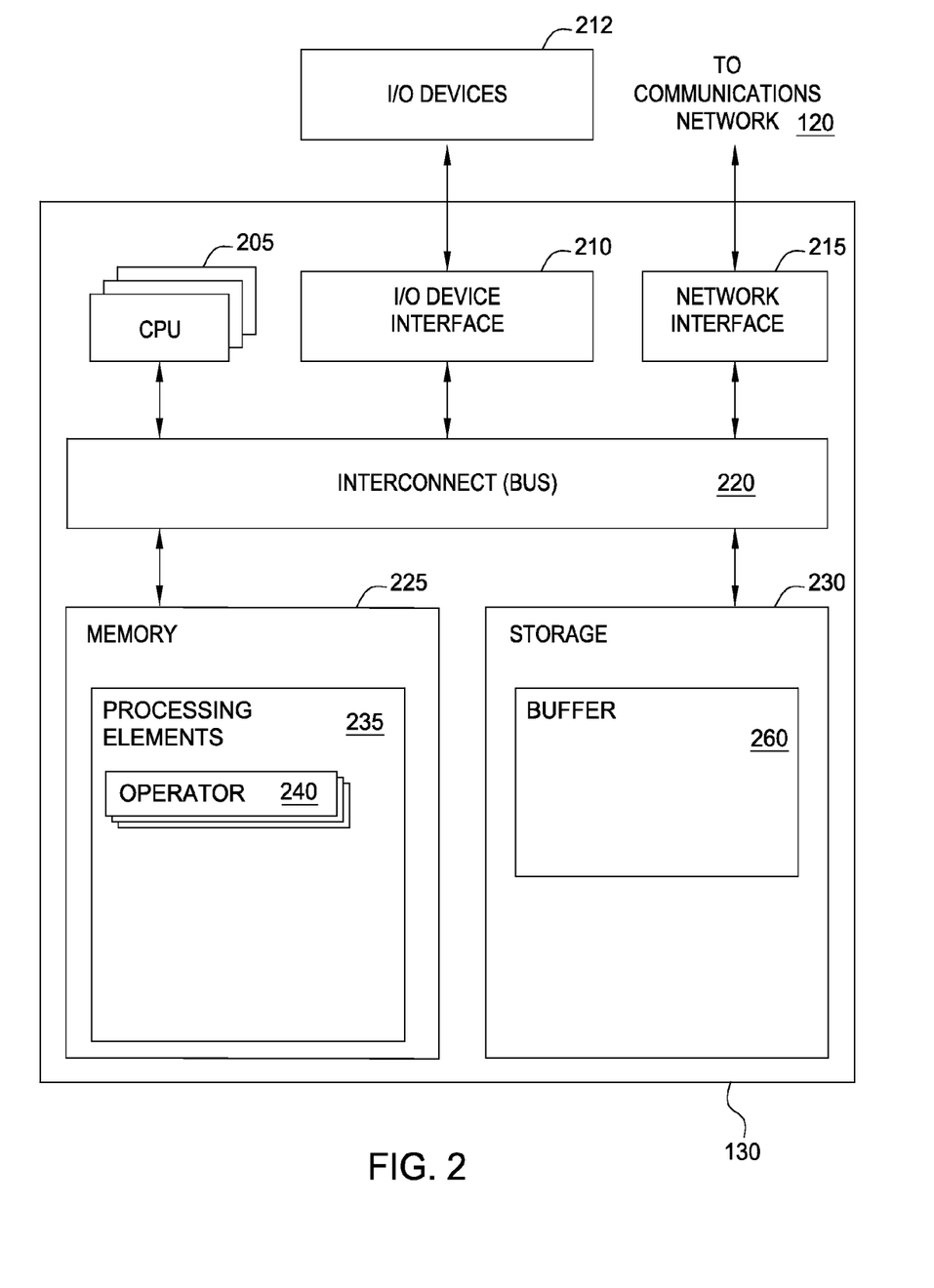
FIG. 2 is a more detailed view of the compute node of FIGS. 1A-1B, according to one embodiment of the invention.

FIG. 2 is a more detailed view of the compute node 130 of FIGS. 1A-1B, according to one embodiment of the invention. As shown, the compute node 130 includes, without limitation, at least one CPU 205, a network interface 215, an interconnect 220, a memory 225, and storage 230. The compute node 130 may also include an I/O devices interface 210 used to connect I/O devices 212 (e.g., keyboard, display and mouse devices) to the compute node 130.

Each CPU 205 retrieves and executes programming instructions stored in the memory 225. Similarly, the CPU 205 stores and retrieves application data residing in the memory 225. The interconnect 220 is used to transmit programming instructions and application data between each CPU 205, I/O devices interface 210, storage 230, network interface 215, and memory 225. CPU 205 is included to be representative of a single CPU, multiple CPUs, a single CPU having multiple processing cores, and the like. In one embodiment, a PE 235 is assigned to be executed by only one CPU 205 although in other embodiments the operators 240 of a PE 235 may comprise one or more threads that are executed on a plurality of CPUs 205. The memory 225 is generally included to be representative of a random access memory (e.g., DRAM or Flash). Storage 230, such as a hard disk drive, solid state device (SSD), or flash memory storage drive, may store non-volatile data.

In this example, the memory 225 includes a plurality of processing elements 235. Each PE 235 includes a collection of operators 240 that are fused together. As noted above, each operator 240 may provide a small chunk of code configured to process data flowing into a processing element (e.g., PE 235) and to emit data to other operators 240 in the same PE or to other PEs in the stream computing application. Such processing elements may be on the same compute node 130 or on other compute nodes that are accessible via communications network 120.

As shown, storage 230 contains a buffer 260. Although shown as being in storage, the buffer 260 may located in the memory 225 of the compute node 130 or a combination of both. Moreover, storage 230 may include storage space that is external to the compute node 130.

Figure 3:
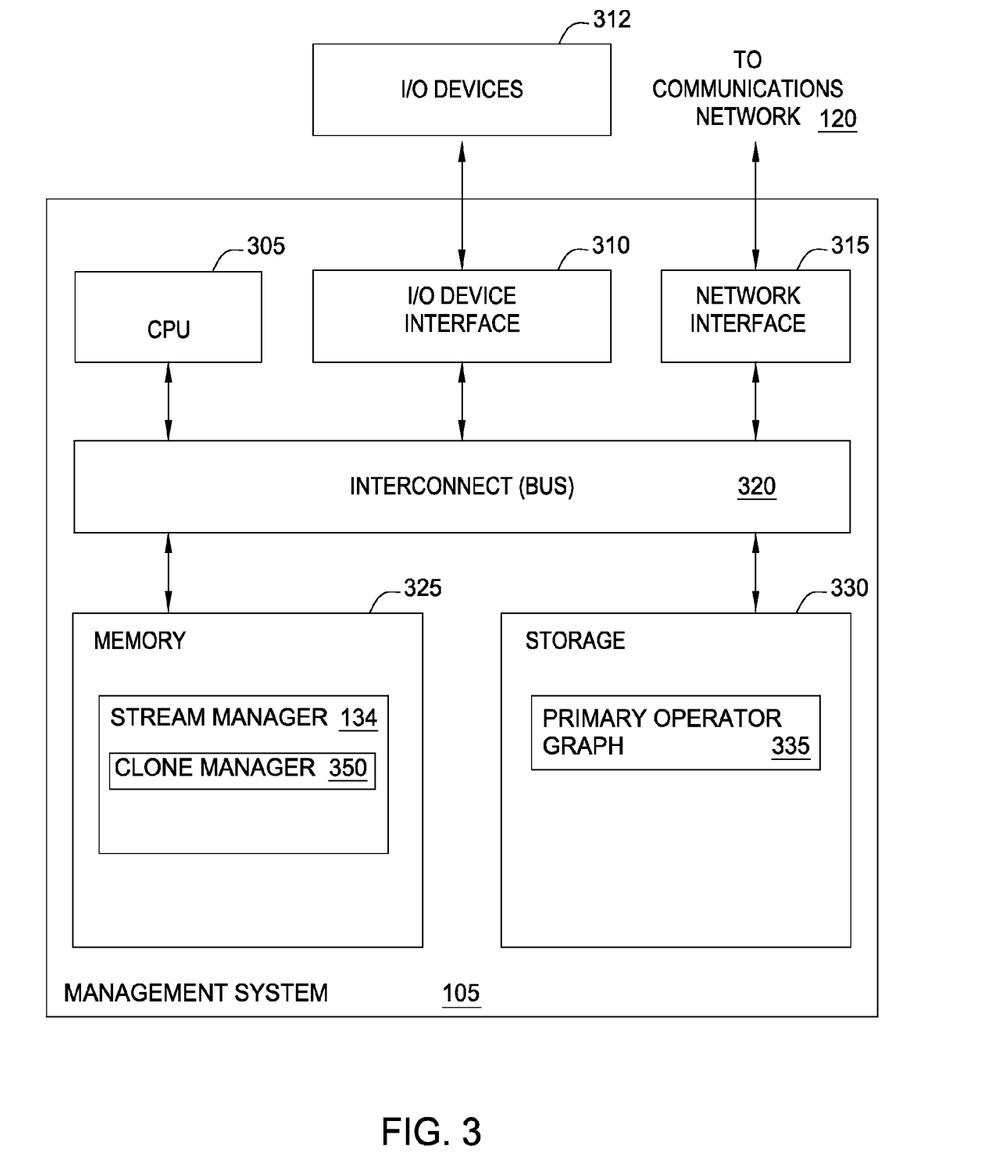
FIG. 3 is a more detailed view of the server management system of FIGS. 1A-1B, according to one embodiment of the invention.

FIG. 3 is a more detailed view of the server management system 105 of FIG. 1, according to one embodiment of the invention. As shown, server management system 105 includes, without limitation, a CPU 305, a network interface 315, an interconnect 320, a memory 325, and storage 330. The client system 130 may also include an I/O device interface 310 connecting I/O devices 312 (e.g., keyboard, display and mouse devices) to the server management system 105.

Like CPU 205 of FIG. 2, CPU 305 is configured to retrieve and execute programming instructions stored in the memory 325 and storage 330. Similarly, the CPU 305 is configured to store and retrieve application data residing in the memory 325 and storage 330. The interconnect 320 is configured to move data, such as programming instructions and application data, between the CPU 305, I/O devices interface 310, storage unit 330, network interface 305, and memory 325. Like CPU 205, CPU 305 is included to be representative of a single CPU, multiple CPUs, a single CPU having multiple processing cores, and the like. Memory 325 is generally included to be representative of a random access memory. The network interface 315 is configured to transmit data via the communications network 120. Although shown as a single unit, the storage 330 may be a combination of fixed and/or removable storage devices, such as fixed disc drives, removable memory cards, optical storage, SSD or flash memory devices, network attached storage (NAS), or connections to storage area-network (SAN) devices.

As shown, the memory 325 stores a stream manager 134. Additionally, the storage 330 includes a primary operator graph 132. The stream manager 134 may use the primary operator graph 132 to route tuples to PEs 235 for processing. The stream manager 134 also includes a clone manager 350 for cloning selected PEs 235 to take advantage of available hardware such as memory 225 or CPUs 205.

Figure 4:
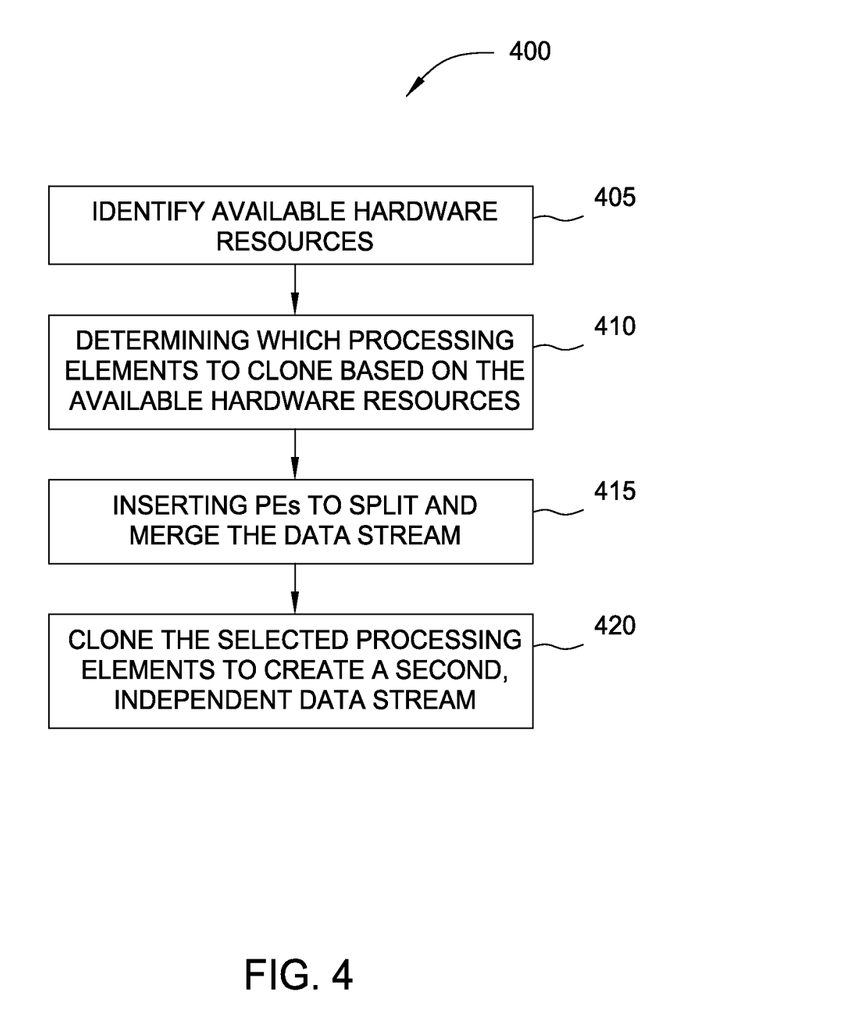
FIG. 4 is a flow chart illustrating a technique for cloning a processing element in an operator graph, according to one embodiment of the invention.

FIG. 4 is a flow chart illustrating a technique for cloning a processing element in an operator graph, according to one embodiment of the invention. At step 405, the clone manager 350 identifies available or underutilized hardware resources in the computing infrastructure 100. The clone manager 350 may, for example, monitor different hardware resources in the compute nodes $130_{1-4}$ to determine whether a CPU is idle. As used herein, an "idle CPU" means a CPU 205 on a compute node 130 that is not currently assigned to execute a PE or, in some embodiments, an operator that is in the operator graph. Additionally, the clone manager 350 may monitor the CPU usage of the CPUs 205 (or cores of the CPU) and flag CPUs or CPU cores whose usage falls below a predetermined threshold. Additionally or alternatively, the clone manager 150 may monitor usage of the memory 225 of a compute node 130. If, for example, the accesses to the memory fall below a certain threshold, the clone manager 350 may mark the memory 225 has being underutilized. The clone manager 350 may also determine if a threshold amount of memory has been unused or available for a predefined period of time.

At step 410, the clone manager 350 determines which PEs may be cloned based on the available hardware resources. In one embodiment, only a subset of the PEs in the operator graph may be cloned. The clone manager 350 may evaluate whether a stream programmer marked the PEs as "cloneable". The marked PEs may indicate that the PEs do not have to process tuples in the order they are received. That is, processing currently received tuples does not depend on tuples that were previously received. The stream programmer may identify one or more PEs that have this characteristic as cloneable. If the clone manager 350 determines that a computer resource is underutilized, it determines which of the cloneable PEs to clone so that the hardware resources of the infrastructure 100 are more efficiently used.

In one embodiment, the clone manager 350 may match computer resources and cloneable PEs by their location. For example, if a compute node 130 has an idle CPU 205, then the clone manager 350 may first determine if any cloneable PEs 235 are currently being hosted on the same compute node 130 as the underutilized CPU 205. If so, that PE 235 may be selected from the set of cloneable PEs.

In another embodiment, the clone manager 350 may match computer resources and cloneable PEs by the number of available of CPUs 205 and a portion of the execution graph that contains a plurality of directly connected cloneable PEs. For example, if the clone manager 350 determines that two CPUs 205 are available and that there are two cloneable PEs that are directly connected in an execution path, it may clone both of those PEs, even if they are assigned to different compute nodes 130. Further, the clone manager 350 may be configured to select this option over a single cloneable PE that is located on the same compute node 130 as the idle CPUs 205. Nonetheless, the disclosed embodiments are not limited to any particular method of selecting which PEs to clone from a set of cloneable PEs.

At step 415, the clone manager 350 may insert into the operator graph PEs to split and merge the data stream. This is shown in detail in FIGS. 5A-5C.

Figure 5A:
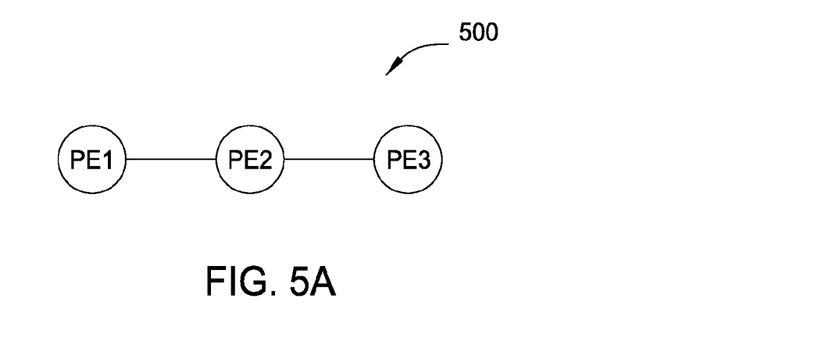
FIGS. 5A-5C illustrate cloning a processing element to create a parallel execution path, according to embodiments of the invention.
Figure 5B:
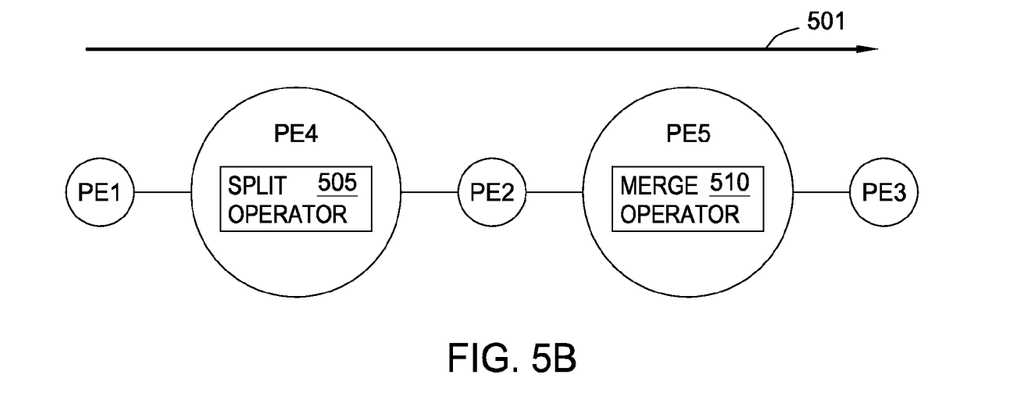
Figure 5C:
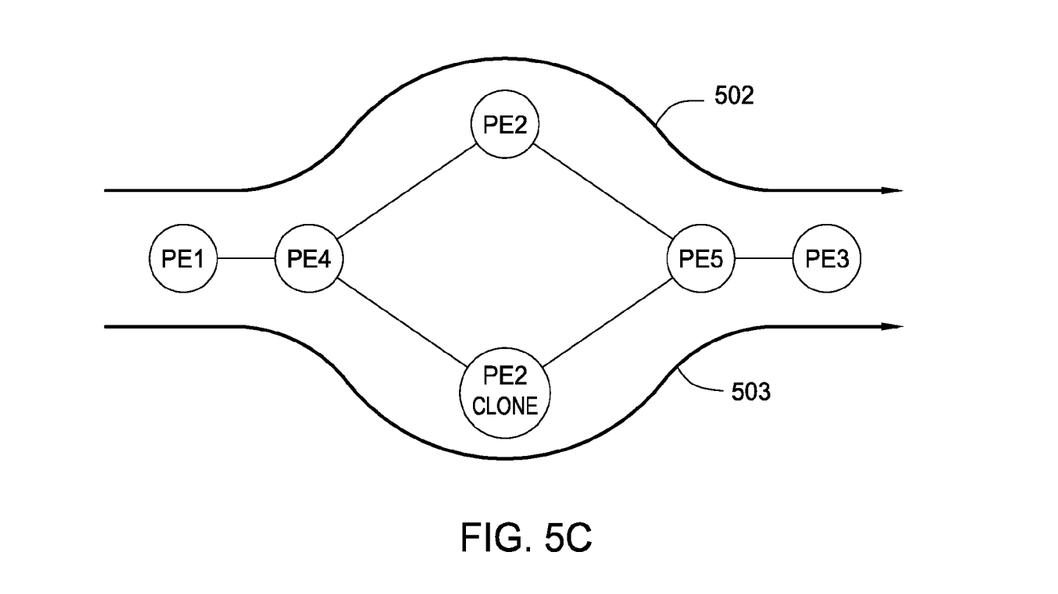

FIGS. 5A-5C illustrate cloning a processing element to create a parallel execution path, according to embodiments of the invention. FIG. 5A shows a portion of an execution path 500 that includes PE1-3 where PE2 is a cloneable PE. While the streaming application executes, tuples pass from the operators of PE1 to PE2 and from the operators of PE2 to PE3.

FIG. 5B illustrates inserting PEs to split and merge the data flowing in the execution path. As shown, PE4, which includes a split operator 505 is inserted between PE1 and PE2. The split operator 505 splits the data stream flowing in the execution path 501 between two or more PEs. Specifically, the split operator 505 divides the tuples into two separate data streams. In contrast, the merge operator 510 within PE5 receives tuples from two different data streams and merges the tuples to generate a single data stream.

In one embodiment, the clone manager 350 may dynamically insert PE4 and PE5 while the streaming application is processing data. That is, the data stream flowing through the execution path 501 is uninterrupted by inserting the new PEs. Once the cloned PE (or PEs) are generated, the clone manager 350 may activate PE4 and PE5.

Alternatively, PE4 and PE5 may be inserted into the execution path 501 before the streaming application begins to process streaming data. However, PE4 and PE5 may remain inactive until the clone manager 350 determines to clone PE2. That is, the tuples pass through PE4 and PE5 without being processed by the operators 505, 510. Further, the clone manager 350 may insert PEs with split and merge operators upstream and downstream of a plurality of cloneable PEs (i.e., a string of cloneable PEs) within the operator graph in anticipation that the cloneable PEs may be replicated.

Returning to FIG. 4, at step 420 the clone manager 350 clones at least one cloneable PE to generate a second, independent data stream. The cloneable PE may be cloned any number of times. Each time the PE is cloned, the clone manager 350 establishes another parallel execution path.

FIG. 5C illustrates generating two parallel execution paths 502, 503 with at least one cloned processing element. As shown, the clone manager 350 adds PE4, PE5, and cloned PE2 to the operator graph. The clone manager 350 also connects the operators of these PEs to create two parallel execution paths. Execution path 502 includes PE1, PE4, PE2, PE5, and PE3 while execution path 503 includes PE1, PE4, cloned PE2, PE5, and PE3. Because cloned PE2 may include all of the same operators found within PE2, the execution paths 502, 503 are in parallel since they yield the same result given the same tuples to process. Thus, in one embodiment, the parallel execution paths 502, 503 are exact copies.

Although FIGS. 5B-5C illustrate inserting the split/merge PEs in a separate step than inserting the cloned PE, they may be inserted simultaneously. Moreover, the cloned PEs may be inserted dynamically into the operator graph while the streaming application is processing data. In this manner, the split/merge PEs and cloned PEs may be activated as soon as they are inserted. Alternatively, the cloned PEs may be inserted into operator graph before the streaming application begins to process data in anticipation that the clone manager 350 may later determine to activate the cloned PE (and the split/merge PEs) to generate a data stream in execution path 503.

In one embodiment, a parallel execution path with at least one cloned PE may be established without the use of split/merge PEs. That is, step 415 may be omitted from the method 400. For example, the processing elements may use filtering or dynamic connections to generate parallel execution paths. Filtering is an operator construct that determines which received data tuples to process. For example, PE2 may have a filter that instructs it to only process the odd tuples based on a unique tuple identifier while a filter on the cloned PE2 instructs it to only process the even data tuples. Dynamic connections permit the stream manager 134 to couple two separate jobs such that data tuples can flow between the jobs. Here, the cloned PE2 may be part of a different job than the original PE2. The stream manager 134 may configure the operator graph such that the job associated with cloned PE2 receives tuples from PE1, which are processed by the cloned PE and then transmitted to PE3. Both of these techniques of generating parallel execution paths without the use of split/merge PEs may be performed while the streaming application is operating. Alternatively, the streaming application may be temporarily halted while the stream manager 134 configures the filtering or dynamic connections.

Figure 6A:
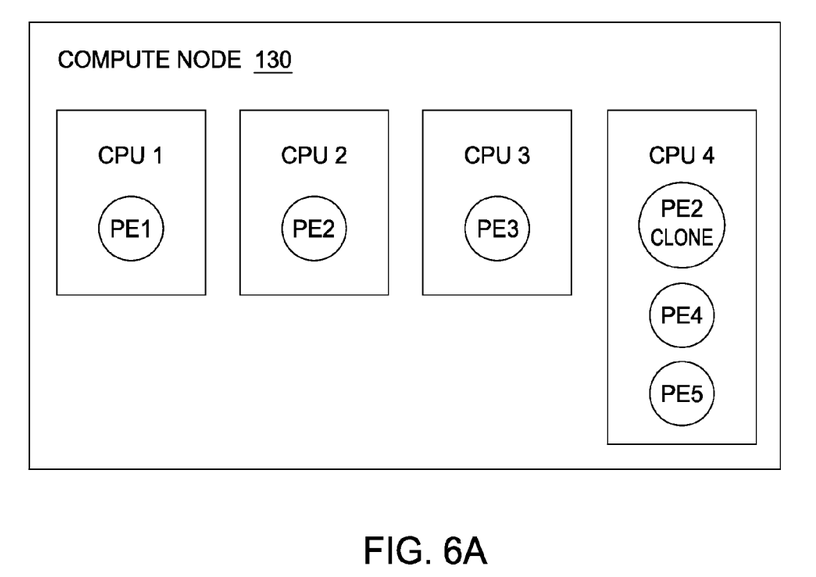
FIGS. 6A-6B illustrate distributing cloned processing elements to CPUs on one or more computer nodes, according to embodiments of the invention.
Figure 6B:
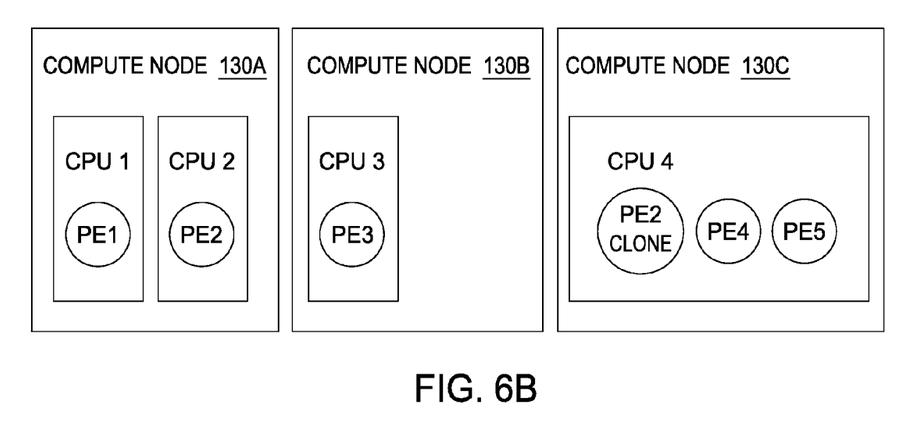

FIGS. 6A-6B illustrate distributing cloned processing compute nodes to CPUs on one or more computer nodes, according to embodiments of the invention. Specifically, the figures show different embodiments of assigning the processing elements of FIG. 5C to CPUs to take advantage of available hardware resources.

FIG. 6A illustrates assigning a cloned PE to an idle CPU within the same compute node 130 as the processing element that was cloned. As shown, all the processing elements of the execution paths 502 and 503 are assigned to CPUs in the same compute node 130—i.e., the operators of the processing elements are all executed by the compute node's 130 CPUs. For example, the clone manager 350 may have determined that CPU4 was idle, and in response, generated the parallel execution path 503. When cloned PE2 was inserted into the operator graph, the clone manager 350 assigns the processing element (and its operators) to CPU4. Moreover, the clone manager 350 may also assign the split/merge PEs (i.e., PE4 and PE5) to the idle CPU. In one embodiment, however, the clone manager 350 may perform load balancing by comparing CPU utilization of CPU1-4 to determine where to assign PE4 and PE5.

FIG. 6B illustrates assigning a cloned PE to an idle CPU that is on a different compute node from the PE that was cloned. As shown, PE2 is assigned to CPU2 on compute node 130A. The clone manager 350 may determine that a different compute node (i.e., compute node 130C) in the computer infrastructure 100 may have an idle CPU (i.e., CPU4). Accordingly, the clone manager 350 may generate the cloned PE and assign that PE to CPU4.

Note that if the cloned PE2 or split/merge PEs were inserted into the operator graph before the streaming application began to process data, the processing elements may have been assigned to any CPU. Because the inactive operators of the PE2, PE4, and PE5 are essentially NOPs, assigning the processing elements to, for example, CPU2 should not affect the throughput of the CPU. However, when the clone manager 350 determines to activate the operators of the cloned PE2 and split/merge PEs, it may then reassign the processing elements to the idle CPU4.

In one embodiment, the clone manager 350 may consider the differences between intra- and inter-nodal communication methods when determining where to place a cloned PE. Assume that the compute node that hosts PE1 has a CPU that is utilized only at 50% while a different compute node has an idle CPU. All things being equal, the clone manager 350 would assign the cloned PE2 to the idle CPU. However, assigning the cloned PE to the CPU on the same compute node as PE1 has the advantage of using intra-nodal communication methods to transfer tuples from PE1 to the cloned PE2. In some cases, intra-nodal communication methods (e.g., shared memory or a data bus) may be faster than inter-nodal communication methods (e.g., a TCP/IP socket). Thus, even though the CPU on the different compute node is idle, the clone manager 350 may determine that the parallel execution path 503 would execute faster if the cloned PE2 were assigned to the CPU on the same compute node as PE1 to permit the execution path 503 to use an intra-nodal communication method rather than an inter-nodal communication method.

Moreover, the clone manager 350 may consider the different types of inter-nodal communication methods or protocols when determining where to place a cloned PE. Different compute nodes 130 may be connected using different communication protocols (e.g., RDMA, TCP/IP, shared database access, PCIe, etc.) which provide different data speeds. Accordingly, the clone manager 350 may consider the inter-nodal communication protocol before assigning a cloned PE to a CPU in a different compute node. That is, the clone manager 350 may decide not to assign cloned PE2 to an idle CPU4 of compute node 130C if the inter-nodal communication between compute node 130A and 130C is one of the slower communication protocols.

Additionally, the clone manager 350 may evaluate the current available bandwidth of the inter-nodal communication connection before assigning the cloned PE to a different compute node. For example, even if the communication connection between compute nodes 130A and 130C uses the fastest protocol available, if more than, e.g., 90% of the connection's bandwidth is currently being used, the clone manager 350 may determine not to assign the cloned PE2 to CPU4.

In one embodiment, the clone manager 350 may consider a different hardware resource on a compute node, such as available memory. If the clone manager 350 determines that a compute node 130 is accessing its memory (e.g., RAM, cache, and the like) below a threshold rate, the manager 350 may activate a cloned PE on that compute node. Furthermore, like with CPU utilization, the clone manager 350 may assign a cloned PE to a different compute node than the node that hosts the original PE if the remote compute node has underutilized memory.

In another embodiment, the clone manager 350 may monitor and consider a combination of different hardware resources when determine when and where to activate a cloned PE. For example, the clone manager 350 may activate a cloned PE if the utilization of at least one CPU on a compute node is less than 50% and requests for data stored in RAM is below a set threshold rate.

Figure 7A:
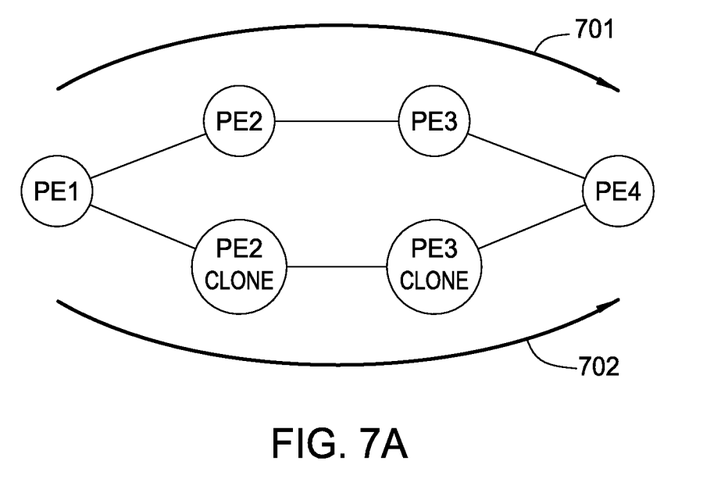
FIGS. 7A-7B illustrate cloning a plurality of processing elements in a single execution path to generate one or more parallel execution paths, according to embodiments of the invention.

FIGS. 7A-7B illustrate cloning a plurality of processing elements in a single execution path, according to one embodiment of the invention. FIG. 7A illustrates two parallel execution paths where at least two processing elements were cloned. Specifically, PE2 and PE3 of execution path 701 were cloned to generate execution path 702 which includes cloned PE2 and cloned PE3. In this manner, a plurality of processing elements that are directly connected in an execution path may be cloned to generate a parallel execution path where the cloned processing elements are also directly connected. In this embodiment, "directly connected" in an execution path means that tuples are passed between the processing elements. Any number of directly connected processing elements may be cloned to generate a parallel execution path.

Each of the cloned PEs may be placed in the computer infrastructure 100 to take advantage of available hardware resources as discussed in the previous embodiments. For example, cloned PE2 and cloned PE3 may be located on one or more idle CPUs.

Figure 7B:
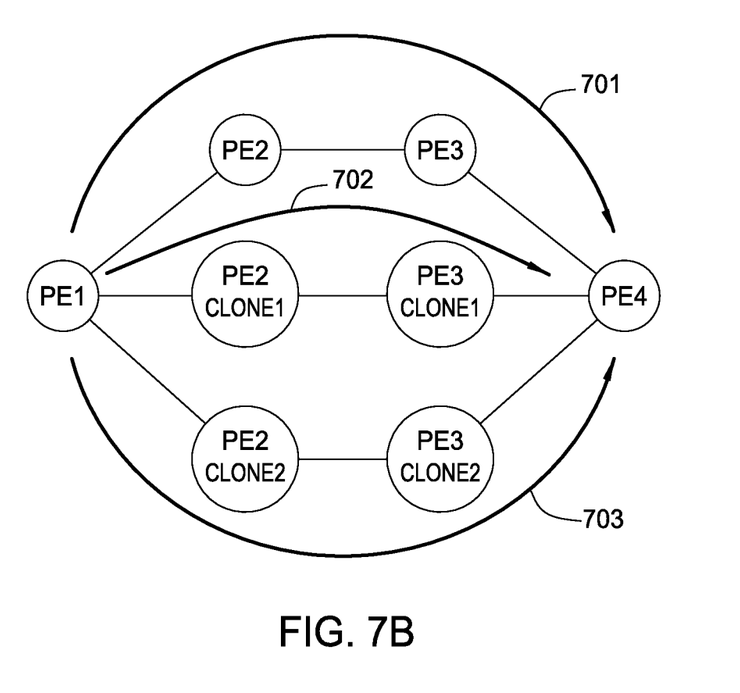

FIG. 7B illustrates cloning the same PE multiple times, thereby generating multiple parallel execution paths. As shown, the clone manager 350 may clone PE2 and PE3 multiple times to generate parallel execution paths 702 and 703. For example, the clone manager 350 may identify four idle CPUs within a compute node and assign the four cloned processing elements to the CPUs. In this manner, the stream may create as many parallel execution paths as it has available resources.

Although not shown, the execution paths in FIGS. 7A-7B may also include a PE with a split operator that is upstream from the cloned PE2 and a PE with a merge operator that is downstream from the cloned PE3.

FIGS. 8A-8D illustrate un-fusing and distributing operators of a processing element onto a plurality of CPUs, according to embodiments of the invention. Instead of cloning PEs to generate parallel execution paths, the stream manager 134 may un-fuse the operators of a processing element to take advantage of available hardware resources—e.g., idle CPUs, available memory, and the like.

As mentioned above, a PE may comprise of a plurality of fused operators. In one embodiment, the fused operators of a PE execute as a single process. Thus, each of the fused operators is executed by the CPU that is assigned the process. Moving an operator to a different CPU may require the operator to be un-fused from the current processing element (i.e., process) and transferred into a different processing element.

Figure 8A:
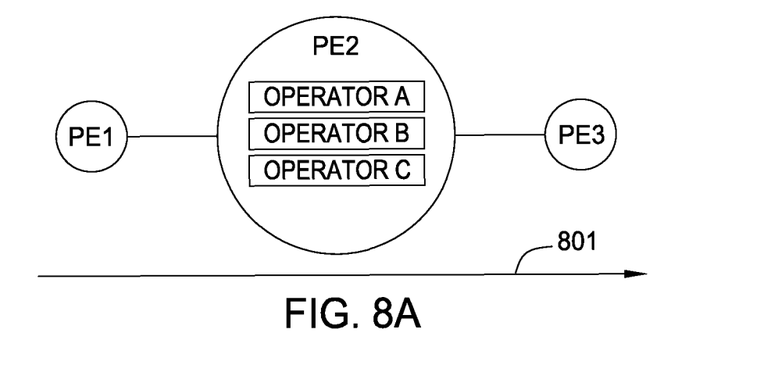
FIGS. 8A-8D illustrate un-fusing and distributing operators of a processing element onto a plurality of CPUs, according to embodiments of the invention.

FIG. 8A illustrates an execution path 801 where PE2 is made up of three fused operators—Operators A, B, and C. The stream manager 134 may determine, using the criteria discussed above, that the compute node to which PE2 is assigned has idle CPUs. Instead of cloning PE2 to generate a parallel execution path, the stream manager 134 may un-fuse one or more of the operators in PE2 to generate additional processing elements. Because in one embodiment a processing element may only be assigned to a single CPU, the operators included within that processing element must be executed by the same CPU.

Figure 8B:
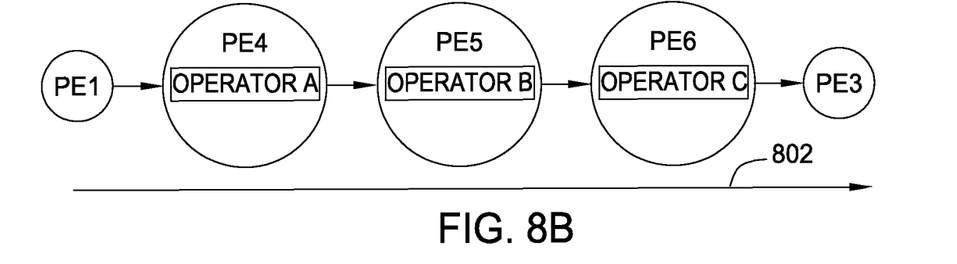

FIG. 8B illustrates that the stream manager 134 may un-fuse the operators in PE2 to generate PE4 with Operator A, PE5 with Operator B, and PE6 with Operator C. In this manner, any processing element with two or more operators may be un-fused such that at least one of the operators is transferred to a new processing element or to an existing processing element that already includes one or more operators. For example, the clone manager 350 may only un-fuse Operator C from PE2 to generate a new processing element. Thus, PE2 would still include Operators A and B.

In one embodiment, the stream manager 134 may need to ensure that the new processing elements are arranged in the proper order. For example, if Operator A passed data tuples in PE2 to Operator B using an intra-nodal communication method, then the stream manager 134 ensures that PE4 is located upstream from PE5 to maintain the same order.

Figure 8C:
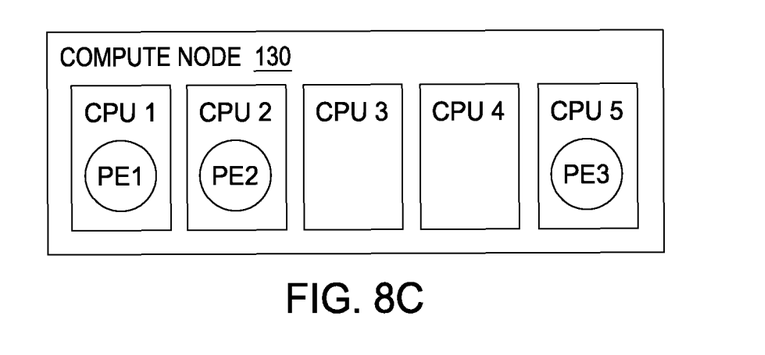

FIG. 8C illustrates a compute node that may host the PEs illustrated in FIG. 8A. As shown, CPU3 and CPU4 do not host any of the processing elements in execution path 801. The stream manager 134 may identify the idle CPUs and determine to un-fuse the operators of PE2 to take advantage of the available hardware resources. Note that the stream manager 134 may use the same techniques for identifying available hardware resources that were discussed above.

Figure 8D:
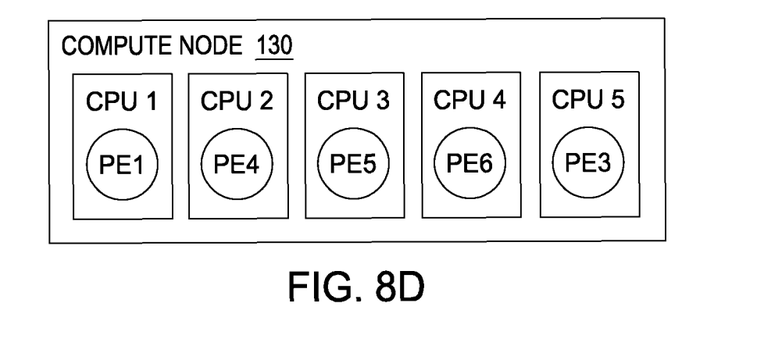

FIG. 8D illustrates the compute node shown in FIG. 8C after un-fusing the operators to take advantage of available hardware resources. As shown, FIG. 8D illustrates that the processing elements of execution path 802 may each be located on separate CPUs. That is, Operator B (i.e., PE5) is executed by CPU3 while Operator C (i.e., PE6) is executed by CPU4. Transferring the operators to processing elements assigned to idle CPUs may result in the execution path 802 processing data tuples at a faster rate than the execution path 801.

Note that operators may be un-fused and assigned to different compute nodes than where the operators are currently running. However, like the clone manager 350, the stream manager 134 may consider the differences between intra-nodal and inter-nodal communication methods, the different types of inter-nodal communication protocols, or the bandwidth utilization of the connections between compute nodes when determining when and where to transfer the different operators. For example, before transferring Operator B or C to be executed by a CPU on a different compute node, the stream manager 134 may determine whether the advantages of using an idle CPU on a different compute node outweigh the disadvantage that may come from using an inter-nodal communication method for transferring data tuples between the operators rather than an intra-nodal communication method.

CONCLUSION

Stream applications may inefficiently use the hardware resources that execute the processing elements of the data stream. For example, a compute node may host four processing elements and execute each using a CPU. However, other CPUs on the compute node may sit idle. To take advantage of these available hardware resources, a stream programmer may identify one or more processing elements that may be cloned. The cloned processing elements may be used to generate a different execution path that is parallel to the execution path that includes the original processing elements. Because the cloned processing elements contain the same operators as the original processing elements, the data stream that was previously flowing through only the original processing element may be split and sent through both the original and cloned processing elements. In this manner, the parallel execution path may use the available hardware resource to increase the throughput of the data stream.

Additionally, operators within a processing element that are executed by the same CPU or CPU core may be divided and fused into a different processing element to take advantage of an idle CPU or underutilized memory. For example, an operator may be un-fused from the original PE and placed in a new PE that is assigned to a previously idle CPU.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A computer program product comprising:
a non-transitory computer-readable storage medium having computer-readable program code embodied therewith, the computer-readable program code comprising computer-readable program code configured to:
receive streaming data to be processed by a plurality of processing elements, each comprising one or more operators, the operators processing at least a portion of the received data;
establish an operator graph of the operators, the operator graph defining at least one execution path in which a first operator of the operators is configured to receive data tuples from at least one upstream operator and transmit data tuples to at least one downstream operator;
identify, relative to predefined criteria, a first and second underutilized hardware resource in a computing system that executes the operators;
clone a first processing element of the plurality of processing elements such that the cloned processing element comprises the same one or more operators as the first processing element;
determine respective communication speeds between a hardware resource hosting the first operator and each of the first and second underutilized hardware resources, wherein the first operator is one of upstream and downstream of the cloned processing element in the operator graph;
select, based on the respective communication speeds, one of the first and second underutilized hardware resources to host the cloned processing element;
generate, after determining to clone the first processing element, a first execution path comprising the cloned processing element, the first execution path is configured to process at least a portion of the received streaming data using the selected underutilized hardware resource, wherein the first execution path executes in parallel to a previously configured second execution path that includes the first processing element; and
activate, in the operator graph downstream from the first and second execution paths, a second processing element comprising a merge operator that merges data tuples received from both the first and second execution paths into a single data stream.

2. The computer program product of claim 1, further comprising computer-readable program code configured to:
activate in the operator graph upstream from the cloned and first processing elements a third processing element comprising a split operator that transmits data tuples to both the first and second execution paths.

3. The computer program product of claim 2, further comprising computer-readable program code configured to insert the cloned, second, and third processing elements into the operator graph while the plurality of processing elements are processing the received streaming data.

4. The computer program product of claim 1, wherein the underutilized hardware resource is at least one of: a CPU and a portion of memory.

5. The computer program product of claim 4, wherein the underutilized hardware resource is a CPU that is not currently executing one of the operators of one of the plurality of processing elements.

6. The computer program product of claim 1, further comprising computer-readable program code configured to:
clone a third processing element of the plurality of processing elements to generate a second cloned processing element comprising the same one or more operators as the third processing element, wherein the third processing element is directly connected to the first processing element in the second execution path; and
process the received streaming data in the first execution path that comprises the second cloned processing element, wherein the second cloned processing element processes the received streaming data using the underutilized hardware resource.

7. The computer program product of claim 1, further comprising computer-readable program code configured to determine whether the first processing element is cloneable, wherein a cloneable processing element is able to process the received data tuples in a different order than an order that the data tuples were received.

8. A system, comprising:
a computer processor; and
a memory containing a program that, when executed on the computer processor, performs an operation for processing data, comprising:
receiving streaming data to be processed by a plurality of processing elements, each comprising one or more operators, the operators processing at least a portion of the received data by operation of one or more computer processors;
establishing an operator graph of the operators, the operator graph defining at least one execution path in which a first operator of the operators is configured to receive data tuples from at least one upstream operator and transmit data tuples to at least one downstream operator;
identifying, relative to predefined criteria, an underutilized hardware resource in a computing system that executes the operators;
cloning a first processing element of the plurality of processing elements such that the cloned processing element comprises the same one or more operators as the first processing element;
determining respective communication speeds between a hardware resource hosting the first operator and each of the first and second underutilized hardware resources, wherein the first operator is one of upstream and downstream of the cloned processing element in the operator graph;
selecting, based on the respective communication speeds, one of the first and second underutilized hardware resources to host the cloned processing element;
generating, after determining to clone the first processing element, a first execution path comprising the cloned processing element, the first execution path is configured to process at least a portion of the received streaming data using the selected underutilized hardware resource, wherein the first execution path executes in parallel to a previously configured second execution path that includes the first processing element; and
activating, in the operator graph downstream from the first and second execution paths, a second processing element comprising a merge operator that merges data tuples received from both the first and second execution paths into a single data stream.

9. The system of claim 8, further comprising:
activating in the operator graph upstream from the cloned and first processing elements a third processing element comprising a split operator that transmits data tuples to both the first and second execution paths.

10. The system of claim 9, further comprising, inserting the cloned, second, and third processing elements into the operator graph while the plurality of processing elements are processing the received streaming data.

11. The system of claim 8, wherein the underutilized hardware resource is at least one of: a CPU and a portion of memory.

12. The system of claim 11, wherein the underutilized hardware resource is a CPU that is not currently executing one of the operators of one of the plurality of processing elements.

13. The system of claim 8, further comprising:
cloning a third processing element of the plurality of processing elements to generate a second cloned processing element comprising the same one or more operators as the third processing element, wherein the third processing element is directly connected to the first processing element in the second execution path; and
processing the received streaming data in the first execution path that comprises the second cloned processing element, wherein the second cloned processing element processes the received streaming data using the underutilized hardware resource.

\* \* \* \* \*